Patented June 12, 1951

2,556,516

UNITED STATES PATENT OFFICE 2,556,516

2-ACYLATED ARYLAMINO - 2 - THIOETHYL-IDENE DERIVATIVES OF HETEROCYCLIC NITROGEN BASES

Leslie G. S. Brooker and Frank L. White, Rochester, N. Y., assignors to Eastman Kodak Company, Rochester, N. Y., a corporation of New Jersey No Drawing. Application January 2, 1948, Serial No. 368

14 Claims. (Cl. 260—240)

This invention relates to 2-acylated arylamino-2-thioethylidene derivatives of heterocyclic nitrogen bases and to a process for preparing them.

It is known that 2-(2-anilino-2-thioethylidene)-1-methyl-1,2-dihydropyridine of the following formula:

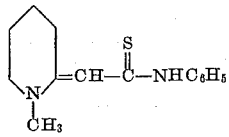

can be prepared by condensing phenylisothiocyanate with 1-methyl-2-methylene-1,2-dihydropyridine. Likewise phenylisothiocyanate can be reacted with 1-methyl-2-methylene-1,2-dihydroquinoline to give 2-(2-anilino-2-thioethylidene)-1-methyl-1,2-dihydropyridine. See Schneider, Gaertner and Jordan, Ber. 57, 522 (1924).

We have now found that 2-arylamino-2-thioethylidene derivatives of certain heterocyclic nitrogen bases, e. g. N-alkylbenzothiazoline bases, N-alkylbenzoselenazoline bases, N-alkyldihydroquinoline bases, N-alkyl - α - naphthothiazoline bases and N-alkyl-β-naphthothiazoline bases, etc. can be prepared by condensing arylisothiocyanates with the appropriate cyclammonium quaternary salt containing a methyl group in a reactive position. While our new process makes available several 2-arylamino-2-thioethylidene compounds not known heretofore, the process is by no means general and is entirely unsatisfactory with 2-methylbenzoxazole quaternary salts, 2-methyl-α-naphthoxazole quaternary salts and others.

It is accordingly an object of our invention to provide new compounds. A further object is to provide a process for preparing such new compounds. Other objects will become apparent hereinafter.

The new compounds of our invention can be represented by the following general formula:

I.

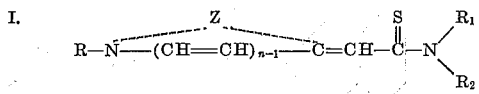

wherein R represents an alkyl group, i. e. an alcohol radical, e. g. methyl, ethyl, n-propyl, n-butyl, isobutyl, n-amyl, isoamyl, β-hydroxyethyl, γ-hydroxypropyl, β-methoxyethyl, β-ethoxyethyl, allyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β - carbomethoxyethyl, carbethoxymethyl, β-carbethoxyethyl, etc., $n$ represents a postive integer of from 1 to 2, $R_1$ represents an aliphatic acyl group, e. g. acetyl, propionyl, n-butyryl, isobutyryl, etc., $R_2$ represents an aryl group, e. g. phenyl, α-naphthyl, β-naphthyl, o-tolyl, m-tolyl, p-tolyl, etc., and Z represents the non-metallic atoms necessary to complete a heterocyclic nucleus selected from the group consisting of heterocyclic nuclei of the benzothiazoline series, heterocyclic nuclei of the benzoselenazoline series, heterocyclic nuclei of the α-naphthothiazoline series, heterocyclic nuclei of the β-naphthothiazoline series, heterocyclic nuclei of the dihydroquinoline series, heterocyclic nuclei of the 4-thiazoline series, heterocyclic nuclei of the thiazolidine series and heterocyclic nuclei of the 3,3-dimethylindoline series. More specifically Z represents the non-metallic atoms necessary to complete a heterocyclic nucleus such as the benzothiazoline, the 4-chlorobenzothiazoline, the 5 - chlorobenzothiazoline, the 6-chlorobenzothiazoline, the 7-chlorobenzothiazoline, the 4-methylbenzothiazoline, the 5-methylbenzothiazoline, the 6-methylbenzothiazoline, the 5-bromobenzothiazoline, the 6-bromobenzothiazoline, the 4-phenylbenzothiazoline, the 5-phenylbenzothiazoline, the 4-methoxybenzothiazoline, the 5-methoxybenzothiazoline, the 6-methoxybenzothiazoline, the 6-iodobenzothiazoline, the 5-iodobenzothiazoline, the 4-ethoxybenzothiazoline, the 5-ethoxybenzothiazoline, the tetrahydrobenzothiazoline, the 5,6-dimethoxybenzothiazoline, the benzoselenazoline, the 5-chlorobenzoselenazoline, the tetrahydrobenzoselenazole, the α-naphthothiazoline, the β-naphthothiazoline, the dihydroquinoline, the 6 - methyldihydroquinoline, the 7 - methyldihydroquinoline, the 8-methyldihydroquinoline, the 6-chlorodihydroquinoline, the 7-chlorodihydroquinoline, the 8-chlorodihydroquinoline, the 4-chlorodihydroquinoline, the 5 - ethoxydihydroquinoline, the 6-ethoxydihydroquinoline, the 7-ethoxydihydroquinoline, the 6-methoxydihydroquinoline, the thiazolidine, the 4-methyl-4-thiazoline, the 4-phenyl-4-thiazoline, the 5-methyl-4-thiazoline, the 5-phenyl-4-thiazoline, the 4,5-dimethyl-4-thiazoline, the 4,5-diphenyl-4-thiazoline, the 4,(2-thienyl)-4-thiazoline, and the 3,3-dimethylindoline nuclei. When Z represents the non-metallic atoms necessary to complete a benzothiazoline nucleus or a thiazolidine nucleus, R also represents aryl, e. g. phenyl.

In accordance with our invention, we prepare our new compounds represented by Formula I above by condensing an arylisothiocyanate with a cyclammonium quaternary salt represented by the following formula:

II. 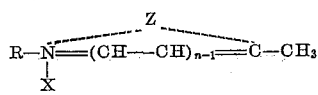

wherein R and $n$ have the values given above, and X represents an anion, e. g. chloride, bromide, iodide, methylsulfate, ethylsulfate, benzenesulfonate, p-toluenesulfonate, acetate, thiocyanate, etc. and Z represents (as in Formula I) the non-metallic atoms necessary to complete a heterocyclic nucleus selected from the group consisting of heterocyclic nuclei of the benzothiazole series, heterocyclic nuclei of the benzoselenazole series, heterocyclic nuclei of the α-naphthothiazole series, heterocyclic nuclei of the β-naphthothiazole series, heterocyclic nuclei of the quinoline series, heterocyclic nuclei of the thiazoline series, heterocyclic nuclei of the thiazole series and heterocyclic nuclei of the 3,3-dimethylindolenine series. The intermediate 2-arylamino-2-thioethylidene compounds thus formed can be acylated with the appropriate carboxylic anhydride to yield our new 2-acylated arylamino-2-thioethylidene compounds.

As aryl isothiocyanates the following are exemplary: phenyl isothiocyanate, α-naphthyl isothiocyanate, β-naphthyl isothiocyanate, o-tolyl isothiocyanate, m-tolyl isothiocyanate, p-tolyl isothiocyanate, etc.

The condensation of the compounds of Formula II with an arylisothiocyanate is advantageously effected in the presence of a basic tertiary organic amine as condensing agent. Especially useful as basic condensing agents are: triethylamine, tri-n-propylamine, tri-n-amylamine, tri-isoamylamine, N-methyl-piperidine, N-ethylpiperidine, dimethylaniline, diethylaniline, etc. Pyridine can be used as a medium or solvent in connection with any of the other tertiary organic amines.

The arylamino-2-thioethylidene compounds thus formed are converted to acylated arylamino-2-thioethylidene compounds by adding an aliphatic carboxylic anhydride to the arylamino-2-thioethylidene compound. Acetic anhydride, propionic anhydride, n-butyric anhydride and isobutyric anhydride are advantageously employed. Pyridine increases the effectiveness of the anhydride.

The following examples will serve to illustrate further the manner of obtaining our new compounds.

*Example 1.—2-(2-anilino-2-thioethylidene)-3-ethylbenzothiazoline*

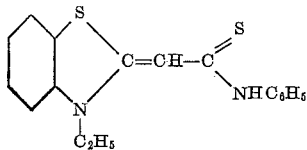

A mixture of 17.45 g. (1 mol.) of 2-methylbenzothiazole etho-p-toluenesulfonate, 13.5 g. (1 mol.+100% excess) of phenylisothiocyanate, 5.05 g. (1 mol.) of triethylamine and 20 cc. of pyridine was heated at the refluxing temperature for 10 minutes. The cool reaction mixture was stirred with cold water and the solid material collected on a filter where it was washed with water. The washed solid was stirred, in a beaker, with 30 cc. of hot methyl alcohol. The resulting suspension was chilled, and the solid material collected on a filter where it was washed with methyl alcohol. It was twice recrystallized from acetone and obtained in 56% yield, as yellow crystals, melting at 195–196° C. with decomposition.

*Example 2.—2-(2-Anilino-2-thioethylidene)-1-ethyl-β-naphthothiazoline*

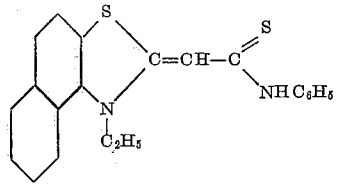

A mixture of 19.95 g. (1 mol.) of 2-methyl-β-naphthothiazole etho-p-toluenesulfonate, 13.5 g. (1 mol.+100% excess) of phenyl isothiocyanate and 5.05 g. (1 mol.) of triethylamine in 25 cc. of pyridine was heated at the refluxing temperature for 10 minutes. Water was then added to the cool mixture. After chilling at 0° C., the solid was collected on a filter and washed with water. The washed solid was stirred with hot methyl alcohol (30 cc.). The solid was filtered from the methyl alcohol and washed on the filter with further methyl alcohol. The yield of above-formulated product was 79 per cent crude and 50 per cent after two recrystallizations from pyridine (12 cc. per gram of product). The pale greenish crystals had M. P. 262–263° C. with decomposition. The product sensitized a photographic gelatino-silver-chlorobromide emulsion to about 530 mμ.

*Example 3.—2-(2-anilino-2-thioethylidene)-3-ethylbenzoselenazoline*

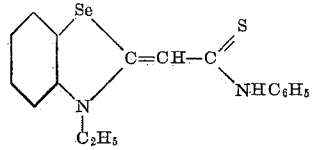

5.05 g. (1 mol.) of triethylamine was added to a mixture of 17.6 g. (1 mol.) of 2-methylbenzoselenazole ethiodide and 20.25 g. (1 mol.+200%) of phenyl isothiocyanate in 25 cc. of pyridine and the reaction mixture was heated at the refluxing temperature for 10 minutes. After cooling, water was added to the reaction mixture and the whole chilled. The aqueous layer was decanted and the residue was stirred with several fresh portions of water. The residue was stirred with hot methyl alcohol. After chilling, the product was washed on the filter with methyl alcohol. The yield was 88 per cent crude and 48 per cent after two recrystallizations from acetone (30 cc. per gram of product). The yellow crystals had M. P. 209–210° C., with decomposition, and they sensitized a photographic gelatino-silver-chlorobromide emulsion to about 490mμ.

*Example 4.—2-(2-anilino-2-thioethylidene)-5-chloro-3-ethylbenzothiazoline*

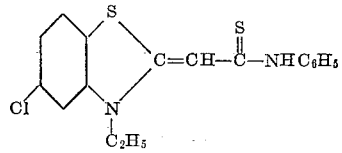

This was prepared as in Example 3, by using 19.22 g. (1 mol.) of 5-chloro-2-methylbenzothiazole etho-p-toluenesulfonate instead of the 2-methylbenzoselenazole ethiodide. The yield was 43 per cent crude and 22 per cent after two recrystallizations from acetone (55 cc. per gram of product). The yellow crystals had M. P. 238-239° C., with decomposition, and they sensitized a photographic gelatino-silver-chlorobromide emulsion to about 500 mµ.

*Example 5.—2-(2-anilino-2-thioethylidene)-1-ethyl-1,2-dihydroquinoline*

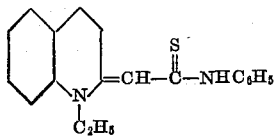

This was prepared as in Example 3 by heating 29.9 g. (1 mol.) of quinaldine ethiodide, 13.5 g. (1 mol.) of phenyl isothiocyanate, 30 cc. of pyridine and 10.1 g. (1 mol.) of triethylamine together at the refluxing temperature for 4 minutes. The yield was 72 per cent crude and 45 per cent after two recrystallizations from ethyl acetate (60 cc. per gram of product). The brownish crystals had M. P. 176-178° C. with decomposition.

*Example 6.—2-(2-anilino-2-thioethylidene)-3-ethyl-4-methyl-4-thiazoline*

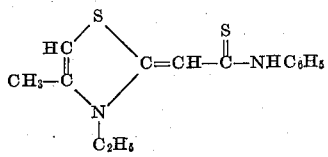

5.38 g. (1 mol.) of 2,4-dimethylthiazole ethiodide, 5.4 g. (1 mol.+100% excess), 10 cc. of pyridine and 2.02 g. (1 mol.) of triethylamine were heated at the refluxing temperature for 10 minutes. The cooled reaction mixture was stirred with cold water and the above-formulated product crystallized out. The product was filtered off and washed on the filter with water. The product was stirred with methyl alcohol, the mixture chilled, the product filtered off and washed on the filter with methyl alcohol. Yield 4.4 g. (80%). The product was dissolved in hot pyridine, methyl alcohol added to the hot solution and the product crystallized out. The mixture was allowed to stand at room temperature. The product was filtered off and washed with methyl alcohol. The product was again recrystallized by dissolving in hot pyridine and adding methyl alcohol to the hot solution. The twice recrystallized product was obtained as light orange crystals M. P. 186-187° C. with decomposition.

*Example 7.—2-(2-anilino-2-thioethylidene)-3-methylthiazolidine*

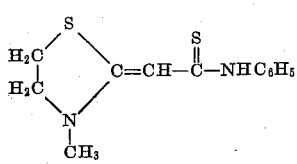

4.86 g. (1 mol.) of 2-methylthiazoline methiodide, 5.4 g. (1 mol.+100% excess), 10 cc. of pyridine and 2.02 g. (1 mol.) of triethylamine were heated at the refluxing temperature for 10 minutes. The cool reaction mixture was stirred with cold water, whereupon a dark oily product separated. The aqueous layer was decanted and the oily product was stirred with several successive portions of cold water. Finally the sticky product was stirred with hot methyl alcohol. The methyl alcohol extract was decanted and chilled. The crystals of the above-formulated product which separated were twice recrystallized from methyl alcohol, whereupon yellow crystals M. P. 162-163° C. with decomposition were obtained.

*Example 8.—2-(2-anilino-2-thioethylidene)-1,3,3-trimethylindoline*

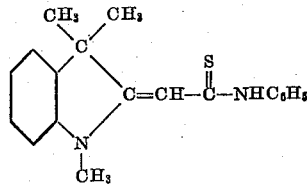

6.02 g. (1 mol.) of 2,3,3-trimethylindolenine methiodide, 5.4 g. (1 mol.) of phenyl isothiocyanate, 10 cc. of pyridine and 2.02 g. (1 mol.) of triethylamine were heated at the refluxing temperature for 10 minutes. The cool reaction mixture was stirred with cold water. An oily product separated. The aqueous layer was decanted and the oily product was stirred with several successive portions of cold water. The product did not crystallize but it became firm. It was dissolved in methyl alcohol and the solution chilled. Crystals of the above-formulated product separated. These were collected on a filter and washed with methyl alcohol. The crystals were dissolved in hot pyridine and hot methyl alcohol added to the hot pyridine solution whereupon crystals separated. This purification was repeated and light brown crystals M. P. 169-170° C. with decomposition were obtained.

*Example 9.—4-(2-anilino-2-thioethylidene)-1-methyl-1,4-dihydroquinoline*

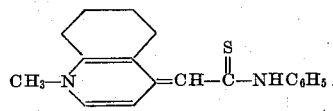

5.7 g. (1 mol.) of lepidine methiodide, 5.4 g. (1 mol.) of phenyl isothiocyanate, 10 cc. of pyridine and 2.02 g. of triethylamine were heated at the refluxing temperature for 4 minutes. The cool reaction mixture was stirred with cold water. The aqueous layer was decanted and the oily residue was washed with several successive portions of cold water. The sticky residue was dissolved in ethyl alcohol, stirred, cooled and finally crystals of the above-formulated product separated. The crystals were collected on a filter and washed with ethyl alcohol. The crystals were dissolved in hot pyridine and hot methyl alcohol was added to the hot pyridine solution, whereupon crystals separated. The crystals were given a second such purification and the product was finally obtained as brown crystals M. P. 213-215° C. with decomposition.

*Example 10—2-(2-acetanilido-2-thioethylidene)-3-ethylbenzothiazoline*

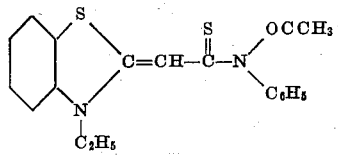

9.36 g. (1 mol.) of 2-(2-anilino-2-thioethylidene)-3-ethylbenzothiazoline and 6.12 g. (1 mol.+100% excess) of acetic anhydride were heated together in 15 cc. of pyridine at the refluxing temperature for 5 minutes. After chilling the reaction mixture at 0° C., the solid was collected on a filter. The yield of above-formulated product was 60 per cent and 46 per cent after two recrystallizations from benzene (30 cc. per gram of product). The orange crystals had M. P. 191 to 192° C. with decomposition. The product sensitized a photographic gelatino-silver-chlorobromide emulsion to about 520 mμ with maximum sensitivity at about 485 mμ.

*Example 11.—2-(2-acetanilido-2-thioethylidene)-1-ethyl-β-naphthothiazoline*

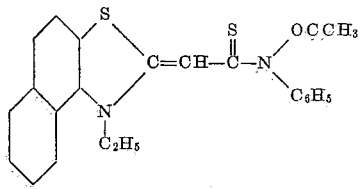

9.05 g. (1 mol.) of 2-(2-anilino-2-thioethylidene)-1-ethyl-β-naphthothiazoline and 5.1 g. (1 mol.+100% excess) of acetic anhydride were heated together in 15 cc. of pyridine at the refluxing temperature for 5 minutes. After chilling the reaction mixture at 0° C., the above-formulated solid product was collected on a filter and thoroughly washed with methyl alcohol. The yield of product was 92 per cent crude and 70 per cent after one recrystallization from acetic anhydride (65 cc. per gram of product). The light orange crystals had M. P. 216–217° C. with decomposition. The product sensitized a photographic gelatino-silver-chlorobromide emulsion to about 550 mμ with maximum sensitivity at about 500 mμ.

*Example 12.—2-(2-acetanilido-2-thioethylidene)-3-methylbenzothiazoline*

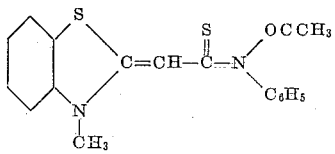

4.90 g. (1 mol.) of 3-methyl-2-methylenebenzothiazoline was dissolved in 100 cc. of acetone and 12.15 g. (1 mol.+200% excess) of phenyl isothiocyanate was added. The reaction mixture was heated at the refluxing temperature for 1 hour and then it was concentrated to about one-half of its volume. After chilling at 0° C., the solid was collected on a filter and washed with acetone. The yield of crude anilino derivative was 86 per cent. 2-(2-acetanilido-2-thioethylidene)-3-methylbenzothiazoline was obtained from the anilino derivative by recrystallizing it from acetic anhydride. The yield of the acetanilido compound was 50 per cent. The yellow crystals had M. P. 201–202° C., with decomposition, and they showed a trace of sensitization in a photographic gelatino-silver-chlorobromide emulsion to about 500 mμ.

*Example 13.—2-(2-acetanilido-2-thioethylidene)-3-ethylbenzoselenazoline*

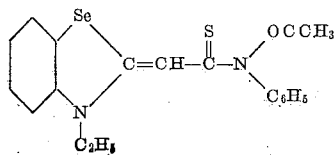

11.9 g. (1 mol.) of 2-(2-anilino-2-thioethylidene)-3-ethylbenzoselenazoline and 7.74 g. (1 mol.+100% excess) of acetic anhydride were heated together in 20 cc. of pyridine solution at the refluxing temperature for 10 minutes. After chilling at 0° C., the product was collected on the filter. The residue was stirred in a beaker, with hot methyl alcohol. After chilling, the product was washed on the filter with methyl alcohol. The yield of product was 88 per cent crude and 55 per cent after two recrystallizations from benzene. The light orange crystals had M. P. 208–209° C., and they sensitized a photographic gelatino - silver - chlorobromide emulsion to about 530 mμ with maximum sensitivity at about 475 mμ.

Similarly, 2-(2-acetanilido-2-thioethylidene)-5-chloro-3-ethylbenzothiazoline was prepared by heating 3.75 g. (1 mol.) of 2-(2-anilino-2-thioethylidene)-5-chloro-3-ethylbenzothiazoline and 2.20 g. (1 mol.+100% excess) of acetic anhydride in 10 cc. of pyridine. The yield of product was 91 per cent crude and 55 per cent after two recrystallizations from benzene. The light orange crystals had M. P. 221 to 222° C., and they sensitized a photographic gelatino-silver-chlorobromide emulsion to about 530 mμ with maximum sensitivity at about 475 mμ.

In a manner similar to that illustrated in the foregoing examples, 2-(2-anilino-2-thioethylidene)-3-ethyl-α-naphthothiazoline can be prepared from 2-methyl-α-naphthothiazole etho-p-toluenesulfonate and phenyl isothiocyanate; 2-[2-(β-naphthylamino) - 2-thioethylidine]-3-ethylbenzothiazoline can be prepared from 2-methylbenzothiazole etho-p-toluenesulfonate and β-naphthylisothiocyanate; 4-(2-acetanilido-2-thioethylidene)-1-methyl - 1,4-dihydroquinoline can be prepared from 4-(2-anilino-2-thioethylidene)-1-methyl-1,4-dihydroquinoline and acetic anhydride; 2-(2-acetanilido-2-thioethylidene) - 1,3,3-trimethylindoline can be prepared from 2-(2-anilino - 2 - thioethylidene)-1,3,3 - trimethylindoline; 2-(2-acetanilido-2-thioethylidene)-1-ethyl-1,2-dihydroquinoline can be prepared from 2-(2 - anilino - 2-thioethylidine)-1-ethyl-1,2-dihydroquinoline and acetic anhydride; 2-(2-propionanilido - 2 - thioethylidene) - 3 - ethyl-4-methyl-4-thiazoline can be prepared from 2-(2-anilino-2-thioethylidene) - 3-ethyl-4-methyl - 4 - thiazoline and propionic anhydride; 2-(2-acetanilido-2-thioethylidene)-3-methylthiazolidene can be prepared from 2-(2-anilino-2-thioethylidene)-3-methylthiazolidine, etc.

As shown in the foregoing examples, many of our new compounds sensitize photographic silver halide emulsions when incorporated therein.

The immediate 2-arylamino-2-thioethylidene compounds can be condensed with phenacyl bromide and similar halogenated ketones to give N-arylthiazolocyanine dyes as described in our copending application Serial No. 366, filed of even date herewith, now U. S. Patent 2,537,876, issued January 9, 1951.

The immediate 2-arylamino-2-thioethylidene compounds can also be condensed with ethyl bromoacetate and similar halogenated esters to give methine dyes containing a 3-aryl-4-thiazolidone nucleus as described in our copending application Serial No. 367, filed of even date herewith.

Our new 2-acylated arylamino-2-thioethylidene compounds can be treated with alkyl salts to give β-acylated arylamino-β-alkylmercaptovinyl cyclammonium quaternary salts represented by the following general formula:

III. 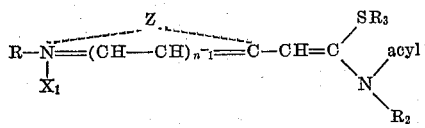

wherein R, n, R₂ and Z have the values given above R₃ represents an alkyl group, e. g. methyl, ethyl, n-propyl, isopropyl, n-butyl, isobutyl, etc., and X₁ represents an anion, e. g. benzenesulfonate, p-toluenesulfonate, acetate, propionate, methylsulfate, ethylsulfate, chloride, bromide, iodide, etc. The β-acylated arylamino-β-alkylmercaptovinyl cyclammonium salts are formed by heating the 2-acylated arylamino-2-thioethylidene compounds with the alkyl salts.

The β-acylated arylamino-β-alkylmercaptovinyl cyclammonium quaternary salts can be condensed with cyclammonium quaternary salts containing a reactive methyl group, i. e. a methyl group in the α- or the γ-position, to give trinuclear cyanine dyes. The condensations are advantageously effected in the presence of a basic condensing agent, e. g. a tertiary amine, e. g. pyridine, triethylamine, tri-n-propyl amine, tri-n-butylamine, triisoamylamine, N-methylpiperidine, N-ethylpiperidine, a mixture of pyridine with any of the other aforesaid tertiary amines, etc. Diluents, such as ethyl, n-propyl, isopropyl or n-butyl alcohol can be used.

Typical of the cyclammonium quaternary salts which contain a reactive methyl group are: 2-methylbenzothiazole ethiodide, 2-methylbenzoselenazole etho-p-toluenesulfonate, quinaldine ethiodide, 2-methylbenzoxazole ethiodide, 2-methyl-β-naphthoxazole ethiodide, 5-chloro-2-methylbenzothiazole ethiodide, 2-methylthiazoline methiodide, 2,4-dimethylthiazole ethiodide, lepidine n-butiodide, 2-methyl-α-naphthothiazole metho-p-toluenesulfonate, etc. The heterocyclic nucleus in the cyclammonium quaternary salt containing the reactive methyl group can be the same or different from the heterocyclic nucleus in the β-acylated arylamino-β-alkylmercaptovinyl cyclammonium quaternary salt.

The following example will serve to illustrate further the manner of obtaining our new β-acylated arylamino-β-alkyl-mercaptovinyl cyclammonium quaternary salts and the manner of obtaining dyes from the β-acylated arylamino-β-alkylmercaptovinyl cyclammonium quaternary salts.

*Example 14.—3,3-diethyl - 9 - methylmercapto-4,5,4',5'-dibenzothiacarbocyanine bromide*

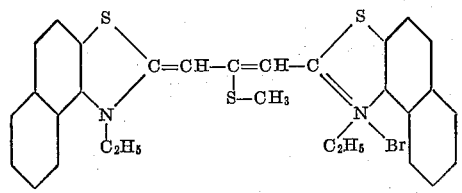

2.02 g. (1 mol.) of 2-(2-acetanilido-2-thioethylidene)-1-ethyl-β-naphthothiazoline and 0.93 g. (1 mol.) of methyl p-toluene sulfonate were heated together at the temperature of the steambath for about 4 hours. This crude product was heated with 3.99 g. (2 mols.) of 2-methyl-β-naphthothiazole etho-p-toluenesulfonate in 15 cc. of pyridine at the refluxing temperature for 15 minutes. The hot reaction mixture was treated with a hot aqueous solution of potassium bromide (5 g.) and the whole chilled at 0° C. The solid was washed on the funnel with water. The residue was stirred, in a beaker, with hot acetone and after chilling the suspension at 0° C. the dye was washed on the filter with acetone. The yield of dye was 14 per cent crude and 8 per cent after two recrystallizations from methyl alcohol (370 cc. per gram of dye). The green crystals had melting point of 227–228° C. with decomposition. The dye sensitized a photographic gelatino-silver-bromoiodide emulsion to about 720 mµ with maximum sensitivity at about 695 mµ.

The alkyl quaternary salts represented by Formula II above can be prepared in known manner by heating the corresponding heterocyclic bases with the appropriate alkyl salt, e. g. methyl iodide, ethyl iodide, n-propyl bromide, n-butyl chloride, methyl p-toluenesulfonate, ethyl p-toluenesulfonate, ethyl benzenesulfonate, diethylsulfate, dimethylsulfate, etc., using a closed tube for the heating where higher temperatures are desired or volatility of the reactants demands. The quaternary iodides and bromides can be converted to the more soluble quaternary chlorides, e. g. by reacting the quaternary bromide or iodide with silver chloride, in a phenol, as described in United States Patent 2,245,249, dated June 10, 1941. Similarly the quaternary bromides can be converted to quaternary acetates by heating with silver acetate in methyl alcohol. Quaternary perchlorates can be formed by treating an ethyl alcoholic solution of the quaternary bromide or iodide with a hot aqueous solution of sodium perchlorate.

The aryl quaternary salts represented by Formula II above cannot be prepared in a manner analogous to that used to make the alkyl quaternary salts. 2-methylbenzothiazole phenohalides are described in United States Patents 2,317,357, dated April 27, 1943, and 2,330,203, dated September 28, 1943. 2-methyl-3-phenylthiazolinium bromide can be prepared by heating thioacetanilide and ethylene dibromide together at 115 to 120° C. (See the copending application of L. G. S. Brooker, Serial No. 622,677, filed October 16, 1945, now U. S. Patent 2,441,558, dated May 18, 1948.) 2-methyl - 3 -(α - naphthyl) thiazolinium bromide can be prepared by heating thioacetyl-α-naphthylamine with ethylene dibromide. (See Brooker application Serial No. 622,677, supra.)

The heterocyclic bases themselves, from which the alkyl quaternary salts can be prepared, are known for the most part. Several of the 2-methylbenzothiazole bases can be prepared by the method of Fries et al., Ann. 407, 208 (1915), in which the appropriate thioacetylaniline is oxidized with alkaline potassium ferricyanide. Thus p-chlorothioacetanilide gives 6-chloro-2-methylbenzothiazole. The thioacetylanilines can be prepared by treating the corresponding acetylaniline with phosphorus pentasulfide. The acetylanilines can be prepared by the action of acetic anhydride or acetyl chloride on the corresponding aniline compound. Several of the 2-methylbenzothiazole bases can also be prepared by reducing bis (o-nitrophenyl)disulfides with zinc dust and acetic acid, acetylating the reduction mixture with acetic anhydride, and closing the ring by heating the resulting mixture. The bis (o-nitrophenyl) disulfides can be prepared from the corresponding o-bromonitrobenzenes by heating the o-bromonitrobenzene with sodium disulfide in methyl alcohol. Thus 2-bromo-4-chloronitrobenzene gives bis(5-chloro-2-nitrophenyl) disulfide which, on reduction and acetylation of the reduction product and closing the ring by heating the resulting mixture, gives 2-methyl-6-chlorobenzothiazole. 2-methyl-5-phenylbenzothiazole can be prepared by reducing bis(3-nitro-4-biphenyl)disulfide with zinc and acetic acid, acetylating the reduction product and closing the ring by heating the resulting mixture. (See the copending application of Gertrude Van Zandt and L. G. S. Brooker, Serial No. 711,816, filed November 22, 1946, now U. S. Patent 2,515,913, dated July 18, 1950.) 2-methyl-4-phenylbenzothiazole can be prepared by oxidizing o-thioacetamidobiphenyl with an alkali metal ferricyanide. (See the copending application of Gertrude Van Zandt and L. G. S. Brooker, Serial No. 709,414, filed November 13, 1946, now U. S. Patent 2,485,679, dated October 25, 1949.) 2-methylbenzoselenazole bases can be prepared by reducing bis(o-nitrophenyl)diselenides with zinc dust and acetic acid, acetylating the reduction mixture with acetic anhydride, and closing the ring by heating the resulting mixture. The bis(o-nitrophenyl)diselenides can be prepared from the corresponding o-bromonitrobenzenes by heating the o-bromonitrobenzenes with sodium diselenide in methyl alcohol. See also Clark, J. Chem. Soc. (London), 1928, 2313.

To sensitize photographic silver halide emulsions with the dyes, the 2-arylamino- or the 2-acylated arylamino-2-thioethylidene compounds disclosed herein, it is only necessary to disperse the dyes and/or the thioethylidene compounds in the emulsions. The usual methods of incorporating sensitizing dyes in photographic emulsions can be used. It is convenient to add the dyes and/or thioethylidene compounds from solutions in appropriate solvents. Methanol has proven satisfactory as a solvent for this purpose. Acetone can also be used. Sensitization by means of the dyes and thioethylidene compounds disclosed herein is primarily directed to the customarily employed developing-out gelatino-silverhalide emulsions in which the halide can be chloride, bromide, iodide or mixtures thereof. The dyes and/or thioethylidene compounds should be uniformly distributed throughout the emulsions.

The concentration of the dyes or thioethylidene compounds in the emulsion can vary widely, e. g. from about 5 to about 100 mg. per liter of flowable emulsion. The concentration of dye and/or thioethylidene compound will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye or thioethylidene compound is dissolved in methyl alcohol or other suitable solvent and a volume of this solution (which may be diluted with water) containing from 5 to 100 mg. of dye is slowly added to about 1000 cc. of a gelatino-silverhalide emulsion, with stirring. With most of the dyes and thioethylidene compounds, 10 to 20 mg. of dye or thioethylidene compound per liter of emulsion suffices to produce the maximum sensitizing effect with the ordinary gelatino-silverbromide and bromiodide emulsions. With finer grain emulsions, somewhat larger concentrations of dye may be necessary to secure the optimum sensitizing effect.

The above statements are only illustrative and are not to be understood as limiting our invention in any sense, as it will be apparent that the dyes and thioethylidene compounds can be incorporated by other methods in photographic silver halide emulsions. For instance the dyes or thioethylidene compounds may be incorporated by bathing a plate or film upon which the emulsion is coated, in a solution of the dye or thioethylidene compound, in an appropriate solvent. Bathing methods, however, ordinarily are not to be preferred.

What we claim as our invention and desire to be secured by Letters Patent of the United States is:

1. The acylated arylamino-2-thioethylidene compounds selected from those represented by the following two general formulas:

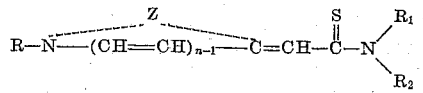

and

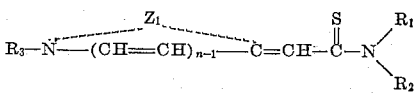

wherein R represents an alkyl group, $n$ represents a positive integer from 1 to 2, $R_1$ represents an aliphatic acyl group, $R_2$ and $R_3$ each represents an aryl group, Z represents the non-metallic atoms necessary to complete a heterocyclic nucleus selected from the group consisting of heterocyclic nuclei of the benzothiazoline series, the benzoselenazoline series, the α-naphthothiazoline series, the β-napthothiazoline series, the dihydroquinoline series, the 4-thiazoline series, the thiazolidine series, and the 3,3-dimethylindoline series, and $Z_1$ represents the non-metallic atoms necessary to complete a heterocyclic nucleus selected from the group consisting of heterocyclic nuclei of the benzothiazoline series and the thiazolidine series.

2. The acetylated arylamino-2-thioethylidene compounds which are represented by the following general formula:

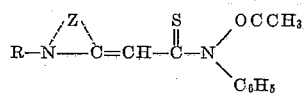

wherein R represents a primary alkyl group of the formula $C_mH_{2m+1}$ wherein $m$ represents a positive integer of from 1 to 4, and Z represents the non-metallic atoms necessary to complete a heterocyclic nucleus of the benzothiazoline series.

3. The acetylated arylamino-2-thioethylidene compound which is represented by the following formula:

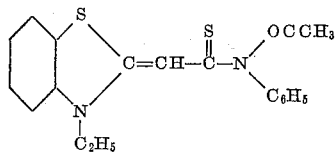

4. The acetylated arylamino-2-thioethylidene compounds which are represented by the following general formula:

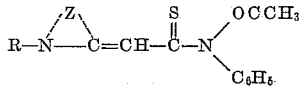

wherein R represents a primary alkyl group of the formula $C_mH_{2m+1}$ wherein $m$ represents a positive integer of from 1 to 4, and Z represents the non-metallic atoms necessary to complete a heterocyclic nucleus of the benzoselenazoline series.

5. The acetylated arylamino-2-thioethylidene compound which is represented by the following formula:

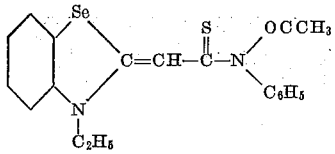

6. The acetylated arylamino-2-thioethylidene compounds which are represented by the following general formula:

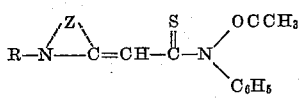

wherein R represents a primary alkyl group of the formula $C_mH_{2m+1}$ wherein $m$ represents a positive integer of from 1 to 4 and Z represents the non-metallic atoms necessary to complete a heterocyclic nucleus of the β-naphthothiazoline series.

7. The acetylated arylamino-2-thioethylidene compound which is represented by the following formula:

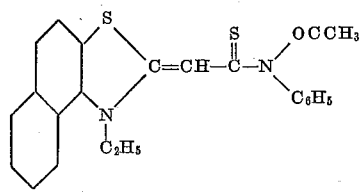

8. A process for preparing an acylated arylamino-2-thioethylidene compound comprising condensing an arylamino-2-thioethylidene compound selected from those represented by the following two general formulas:

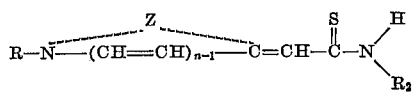

and

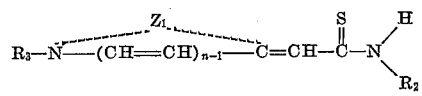

wherein R represents an alkyl group, $n$ represents a positive integer from 1 to 2, $R_2$ and $R_3$ each represents an aryl group, Z represents the non-metallic atoms necessary to complete a heterocyclic nucleus selected from the group consisting of heterocyclic nuclei of the benzothiazoline series, the benzoselenazoline series, the α-naphthothiazoline series, the β-naphthothiazoline series, the dihydroquinoline series, the 4-thiazoline series, the thiazolidine series, and the 3,3-dimethylindoline series, and $Z_1$ represents the non-metallic atoms necessary to complete a heterocyclic nucleus selected from the group consisting of heterocyclic nuclei of the benzothiazoline series and the thiazolidine series, with a carboxylic anhydride.

9. A process for preparing an acetylated arylamino-2-thioethylidene compound comprising condensing an arylamino-2-thioethylidene compound selected from those represented by the following general formula:

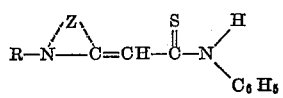

wherein R represents a primary alkyl group of the formula $C_mH_{2m+1}$ wherein $m$ represents a positive integer of from 1 to 4 and Z represents the non-metallic atoms necessary to complete a heterocyclic nucleus of the benzothiazoline series, with acetic anhydride.

10. A process for preparing an acetylated arylamino-2-thioethylidene compound comprising condensing the compound represented by the following formula:

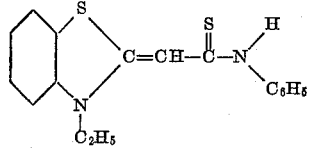

with acetic anhydride.

11. A process for preparing an acetylated arylamino-2-thioethylidene compound comprising condensing an arylamino-2-thioethylidene compound selected from those represented by the following general formula:

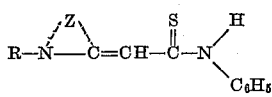

wherein R represents a primary alkyl group of the formula $C_mH_{2m+1}$ wherein $m$ represents a positive integer of from 1 to 4, and Z represents the non-metallic atoms necessary to complete a heterocyclic nucleus of the benzoselenazoline series, with acetic anhydride.

12. A process for preparing an acetylated arylamino-2-thioethylidene compound comprising condensing the compound represented by the following formula:

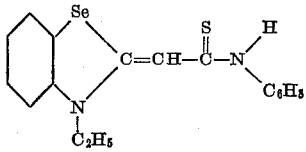

with acetic anhydride.

13. A process for preparing an acetylated arylamino-2-thioethylidene compound comprising condensing an arylamino-2-thioethylidene compound selected from those represented by the following general formula:

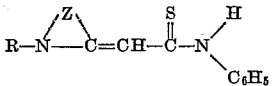

wherein R represents a primary alkyl group of the formula $C_mH_{2m+1}$ wherein $m$ represents a positive integer of from 1 to 4, and Z represents the non-metallic atoms necessary to complete a heterocyclic nucleus of the β-naphthothiazoline series, with acetic anhydride.

14. A process for preparing an acetylated arylamino-2-thioethylidene compound comprising condensing the compound represented by the following formula:

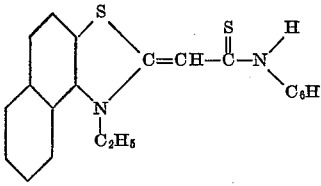

with acetic anhydride.

LESLIE G. S. BROOKER.
FRANK L. WHITE.

(References on following page)

REFERENCES CITED

The following references are of record in the file of this patent:

UNITED STATES PATENTS

| Number | Name | Date |
|---|---|---|
| Re. 18,758 | Wahl | Mar. 7, 1933 |
| 2,202,827 | Brooker | June 4, 1940 |
| 2,332,517 | Kendall | Oct. 26, 1943 |
| 2,345,094 | Brooker | Mar. 28, 1944 |
| 2,393,743 | Brooker | Jan. 29, 1946 |
| 2,398,999 | Brooker | Apr. 23, 1946 |
| 2,423,218 | Anish | July 1, 1947 |
| 2,464,785 | Thompson | Mar. 22, 1949 |

OTHER REFERENCES

Schneider (1924), Berichte de deut. Gesell., vol. 57, pp. 522–532.